United States Patent [19]
Mochizuki et al.

[11] 3,878,097
[45] Apr. 15, 1975

[54] CONTAMINATED WATER TREATING APPARATUS

[75] Inventors: Tadao Mochizuki, No. 648-735, Hatsutomi, Kamagaya-machi, Higashi Katsushika-gun, Chiba Prefecture; Koichi Kawada, Tokorozawa, both of Japan

[73] Assignee: said Mochizuki, by said Kawada

[22] Filed: Dec. 29, 1972

[21] Appl. No.: 319,714

[30] Foreign Application Priority Data
July 31, 1972 Japan.................................. 47-90071

[52] U.S. Cl. ................. 210/151; 210/195; 210/220
[51] Int. Cl............................................ B01d 23/02
[58] Field of Search ............ 210/150, 151, 220, 195

[56] References Cited
UNITED STATES PATENTS
| | | | |
|---|---|---|---|
| 642,460 | 1/1900 | Keaster............................ | 210/220 X |
| 3,232,434 | 2/1966 | Albeasmeyer ....................... | 210/151 |
| 3,327,855 | 6/1967 | Watson et al................... | 210/220 X |
| 3,468,795 | 9/1969 | Joagensen et al............... | 210/220 X |
| 3,563,888 | 2/1971 | Klock............................. | 210/150 X |

*Primary Examiner*—John Adee
*Attorney, Agent, or Firm*—Wenderoth, Lind & Ponack

[57] ABSTRACT

Contaminated water treating apparatus in which contaminated water to be treated is introduced into a tank of the apparatus providing a circulation flow passage for the contaminated water, in which passage a biological oxidation section or sections is provided to improve the purity of the contaminated water when the circulation flow thereof repeatedly passes through the biological oxidation section or sections.

3 Claims, 12 Drawing Figures

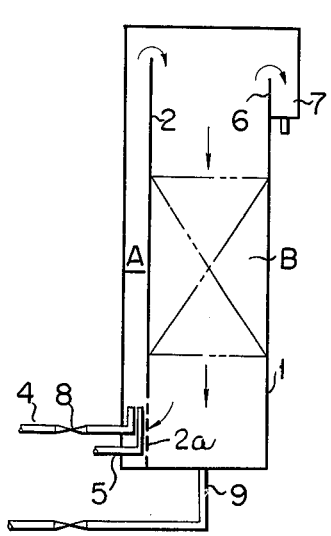
FIG. 1
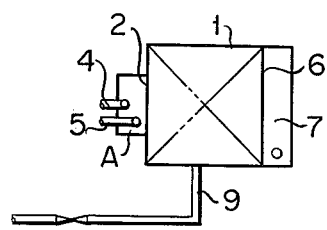
FIG. 2
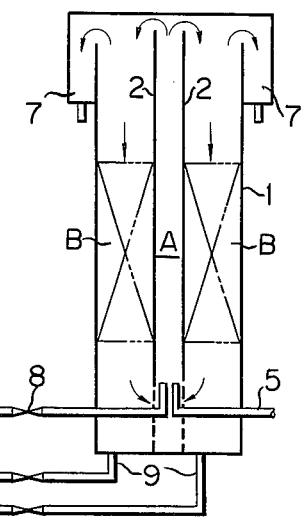
FIG. 3
FIG. 4
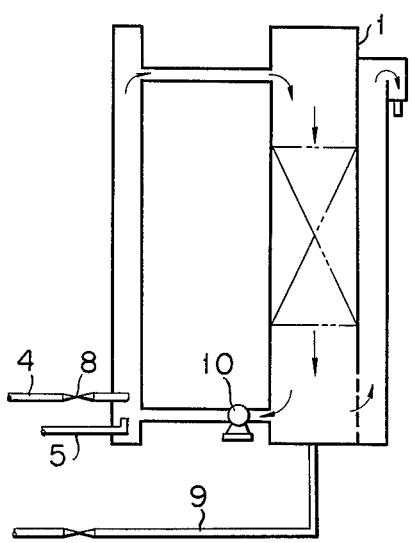
FIG. 5
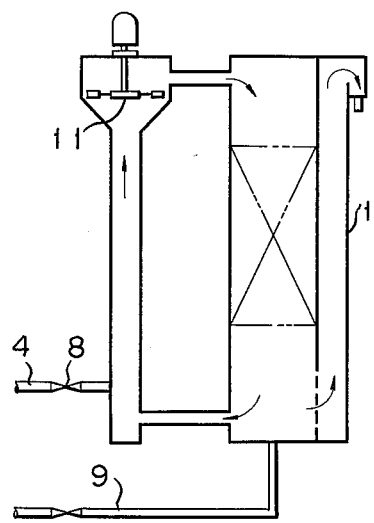
FIG. 7
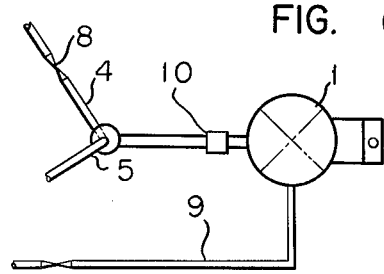
FIG. 6
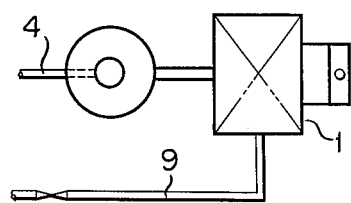
FIG. 8

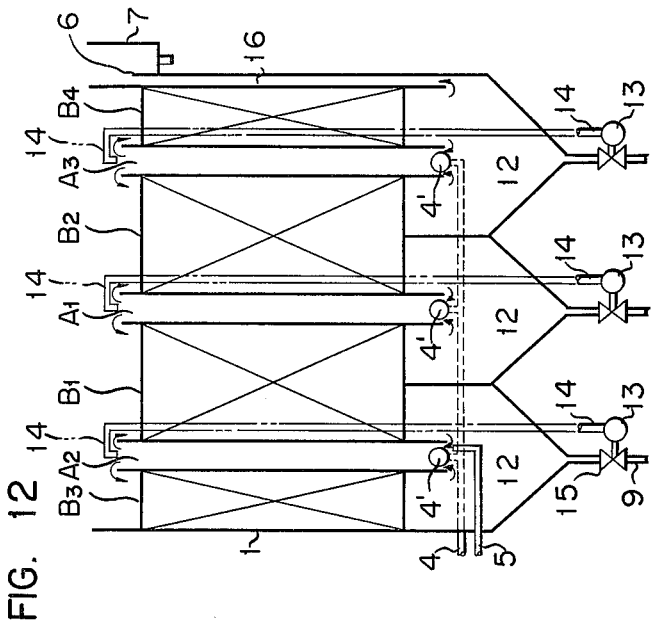
FIG. 9
FIG. 10
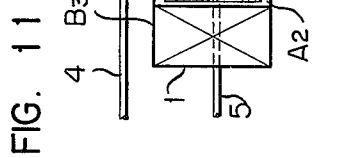
FIG. 11
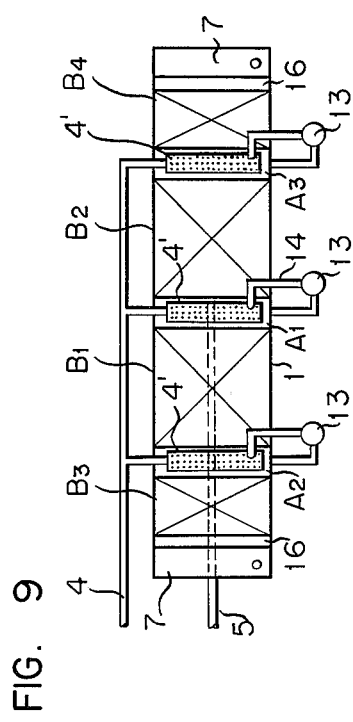
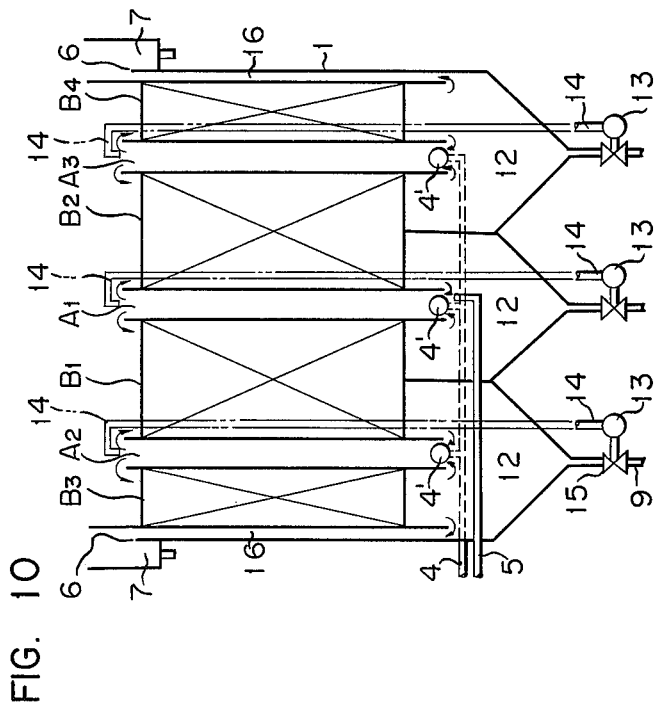
FIG. 12

CONTAMINATED WATER TREATING APPARATUS

BACKGROUND OF THE INVENTION

This invention relates to an apparatus for improving the purity of contaminated water, such as, sewage water and industrial waste water.

As is well known, the rivers and seasides are being contaminated with sewage, waste water from industrial plants and other non-perfectly treated foul waters which are released into the rivers and sea, and as a consequence, the quality of river water that is the source of our drinking water and the living environments of the fishes and shells are being worsened year by year. Accordingly, the processes for improving the purity of such contaminated water have also become complicated.

The degree of contamination of river or sea water is usually expressed by the B.O.D. (biological oxygen demand), and it is understood that improving the purity or cleaning contaminated water means reducing the B.O.D. Known as typical processes of reducing such B.O.D. are a trickling filtration process and an activated sludge process for treatment of sewage, and a low rate filtration process for treatment of supply water. All of these processes are designed to treat contaminated water by biologically oxidizing the organic matters.

Bacteria and other micro-organisms decompose the complicated organic matters which cause contamination of river or sea water, and change them into simplified and stabilized substances. In the above-mentioned biological oxidation processes, in view of the fact that the organic waste matters are rich with food substances for germs or micro-organisms, such germs or micro-organisms are bred in sufficient quantity to let them eat away the contaminative organic matters to thereby improve the purity of the river water contaminated with such matters.

Generally, oxygen is required for activities of such micro-organisms. If oxygen exists in a dissolved state in contaminated water, the micro-organisms (particularly aerobic germs) are activated by taking in such oxygen to decompose the organic matters, and as decomposition of organic matters advances, the B.O.D. is lowered correspondingly. The rate of such decomposition varies widely depending on the degree to which oxygen is dissolved in contaminated water. There are known various processes for biologically oxidizing the organic matters in contaminated water by utilizing the aerobic micro-organisms and for nitrating the inorganic matters such as ammonium, but they may be roughly classified into the following two types: (1) the type in which the micro-organisms locomote with contaminated water, and (2) the type in which contaminated water is passed through the micro-organisms which are fixed at a certain position. The type (1) includes an activated sludge process and modifications thereof, and in each case, biological oxidation is carried out under conditions in which the contaminated water and micro-organisms are well and evenly mingled, but since there is formed no stratification for the respective organism phases, a long-time aeration is required for provoking the reaction which requires the nitrating action to produce the desired results. The type (2), which may be called a fixed micro-organic film process, is further divided into two types; one being the type in which the direction of flow of the contaminated water is fixed, including a trickling filtration process, low rate filtration process, etc., and the other being the type in which the contaminant flow is irregular, including a contact bed process, intermittent bed process, etc. In either of these processes, the micro-organisms are provided under conditions for forming stratification, and hence the mechanism for the relay type decomposition is completed.

However, this type of process involves the possiblity that the filter for contaminated water will become fouled or clogged with the solids such as organic matters in contaminated water or with the dead microorganisms which have fallen off the cluster (layer) of live micro-organisms, and also, contaminated water can pass through the flow passage only once (not circulative) (except for the trickling filtration system provided with a packed column), and therefore the purifying performance is low.

The trickling filtration process, where contaminated water is circulated, has a fairly good purifying performance, but since this process uses a system where contaminated water is flowed down gravitationally through the filler, a certain lamination occurs in to the flow, and hence much time is required for obtaining a desired level of the B.O.D. in the treated water, and reduction of such operating time can hardly be attained unless the apparatus itself is enlarged to an excessive degree.

SUMMARY OF THE INVENTION

An object of the present invention is, therefore, tc provide an improved compact apparatus for improving the purity of contaminated water at high efficiency.

In accordance with the invention, an apparatus foi biologically treating to improve the purity thereof contaminated water is provided comprising a tank defining a chamber, means dividing the chamber of said tank into a plurality of compartments having upper anc lower openings, which compartments are in fluid association with each other through their lower openings a water supply pipe opening into at least one of saic compartments of the tank chamber to supply the contaminated water into said tank, means for establishing a circulation of the contaminated water in said tank tc allow the contaminated water to be lifted up along a wall of said one compartment, at least one biologica oxidation section disposed within the compartment adjacent to said one compartment, the lifted-up contaminated water being fed from the upper opening of saik one compartment through said biological oxidatiot section in said adjacent compartment into said on compartment to be purified, and means for allowin the treated water to be discharged from said tank.

BRIEF DESCRIPTION OF THE DRAWINGS

For a better understanding of the nature of the inven tion, reference may be had to the following detailed de scription, taken in conjunction with the accompanyin drawings, in which:

FIG. 1 is a diagrammatic view, in longitudinal sec tion, of an apparatus according to the present inver tion;

FIG. 2 is a cross-sectional diagrammatic plan vie thereof; and

FIGS. 3 and 4, 5 and 6, 7 and 8, 9 and 10, and 11 an 12 are views corresponding to FIGS. 1 and 2, showin different embodiments of the present invention.

DETAILED DESCRIPTION OF THE EMBODIMENTS

Referring to FIGS. 1 and 2, there is shown an unrefined apparatus from which the apparatus of the present invention is derived, comprising a tank 1 partitioned interiorly into two compartments by a vertical partition wall 2. In one of the compartments is provided a micro-organism oxidation section B charged with a filler designed to increase the contact oxidation area where contaminated water and micro-organisms are to be contacted, and in the wall 2 at the bottom of the said compartment is a plurality of openings 2a between compartments. In the bottom of the other compartment are inserted the open ends of a contaminated water feed pipe 4 and an air supply pipe 5. The top edge of said tank 1 on the opposite side thereof from the wall 2 is lower than the top edge of partition wall 2 to form a treated or purified water overflow section 6, and a treated water discharge flume 7 is provided contiguous to the overflow section 6.

Numeral 8 denotes a contaminated water inflow adjusting valve, and 9 a sediment discharge pipe. It is essential that the valve 8 be adjusted so that the rate of feed of the contaminated water is lower than the circulation flow rate of the contaminated water in the tank 1. Otherwise, the contaminated water will be discharged through the overflow section 6 without the purity being sufficiently improved.

In operation, first the contaminated water is introduced through the feed pipe 4 into the tank 1 until the latter is filled up with the contaminated water to the level of the overflow section 6, air is introduced through the air supply pipe 5 into the tank so that the air performs an air-lifting action, and then the contaminated water inflow adjusting valve 8 is closed. Whereby the contaminated water in the aeration section A is forced to rise up by the air supplied thereinto and begins to flow circulatingly in the tank. At this stage, however, no overflow of the contaminated water from the overflow section 6 takes place, and while the contaminated water repeats its forced circulation within the tank, a film of aerobic germs is formed on the filler in the micro-organism oxidation section B.

After the contaminated water has been subjected to sufficient aeration in the aeration section A and oxidation in the micro-organism oxidation section B to become the treated water having a low B.O.D. and having oxygen dissolved therein to an optimum degree, the inflow adjusting valve 8 is opened to admit a further supply of the contaminated water, the latter being then subjected to repeated aeration and organism oxidation, and thus the contaminated water has the sufficiently reduced and the treated water now begins to flow out from the discharge flume 7 at a rate corresponding to the inflow of the contaminated water. It is to be noted here that the amount of the contaminated water fed in is in inverse proportion to the degree of resulting purification, so that the operator needs to properly adjust the inflow rate of the contaminated water, taking the desired level of B.O.D. of the treated water into consideration.

In the embodiment shown in FIGS. 3 and 4, the outlet of an air supply pipe 5 is positioned at the center of the tank so as to form two circulation flows of the contaminated water on both sides of the central aeration section A, with a micro-organism oxidation section 3 being provided in the passage of each of said convective flows. The function of this embodiment is the same as that of the embodiment of FIGS. 1 and 2.

Although the embodiment of FIGS. 3 and 4 uses a square tank 1, it is also possible to use a cylindrical tank provided with cylindrical micro-organism oxidation sections. The latter case requires less space for installation of the apparatus for the same performance.

In either of the foregoing embodiments, the circulation flow of the contaminated water is established only by the use of air, but it is possible to jointly or independently use a pump 10 as shown in FIGS. 5 and 6 or a surface aeration and agitator device 11 as shown in FIGS. 7 and 8 to expedite such circulation flow. The device 11 in the form of a vaned rotator is disposed substantially at the surface level of the water in the tank. These means permit further enhancement of purifying performance.

As described above, according to the present invention, unlike the conventional systems, contaminated water with oxygen dissolved therein in an optimum proportion is forcibly circulated so that it repetitively passes an organism oxidation section or sections. Thus, the contaminated water is gradually purified while flowing circulatingly along the circulatory passage and is further diluted by the purified treated water to promote purification. It is thus possible with the present invention to realize a reduction in size of the apparatus as compared with prior art devices as well as marked enhancement of the rate of the contaminated water treated. Further, as the purification of the contaminated water according to the present invention is performed by a circulating flow, the tubular structures containing fillers can be retained in a vertical position. This is advantageous in enlarging the contact areas between micro-organisms and contaminated water and in preventing fouling or clogging of the micro-organism oxidation sections by the solids in the contaminated water or by the wafting micro-organisms which have come off the cluster of live micro-organisms settled on the fillers.

In the case of the embodiments thus far described, the treated water overflow section 6 is in direct association with the circulation passage for the contaminated water. This may or may not cause part of the contaminated water from the upper opening of the aeration section A to be discharged from the overflow section 6 without passing through the biological oxidation section B. If so, the B.O.D. of the treated water can not be decreased below a certain level.

Therefore, in order to obtain purified water having a desired low level of B.O.D., apparatuses according to the invention as shown in FIGS. 9 to 12 are provided.

In FIGS. 9 and 10, a tank 1 contains three aeration sections A1, A2 and A3 and four oxidation sections B1, B2, B3 and B4. On both side of the assembly are provided upward outlet flow passages 16 through which the treated water rises up to overflow. Each of the oxidation sections B1, B2, B3 and B4 contains a filler adapted to enlarge the oxidation area where the micro-organisms are to be contacted with the sewage or contaminated water to be treated. There is also provided an air supply pipe 4 through which air or oxygen-enriched air is introduced from the outside of the tank 1 and which has its feed ends opened into the bottom of the respective aeration sections A1, A2 and A3. At each open end of the air supply pipe 4 is provided a diffuser 4'. Numeral 5 denotes a contaminated water feed pipe through which foul water is introduced into the tank 1 from an outside source, with the discharge end of the pipe being opened into the bottom of the central aeration section A1. Numeral 6 indicates an overflow section through which the treated water is overflowed into an adjacent trough 7.

Also in the drawings, numeral 12 designates funnel-shaped sludge reservoirs formed below the respective aeration sections A1, A2 and A3, and 14 the sludge returning conduits, each extending upwardly from the bottom end of each reservoir 12 and open at its other end into the top opening of the corresponding one of the aeration sections A1, A2 and A3, thereby to return the sludge accumulated in each reservoir 12 back into the water to be treated by the action of a pump 13 so as to reduce the amount of sludge discharged, 9 denotes the sludge discharge pipes, and 15 the valves.

In operation of the present device which has the above-described arrangement, first the sewage or contaminated water to be treated is introduced through the feed pipe 5 into the tank 1 until the latter is filled with such water to its full capacity, and when the upper boundary surface of foul water has reached the level of the overflow section 6, air is introduced through the air supply pipe 4 so that an air lifting action occurs to dissolve oxygen in the water to be treated, and then a inflow adjusting valve (not shown) is closed.

The contaminated water thus introduced into each of the aeration sections A1, A2 and A3 is then forced to rise up by the action of introduced air to commence a circulation (in the direction of arrows) through the aeration sections and the corresponding oxidation sections. During this circulation, however, no overflow of the contaminated water from the overflow section 6 takes place, and while the contaminated water in the tank 1 repeats its circulation through the aeration and oxidation sections, a film of aerobic germs is formed on the filler in each oxidation section.

In this way, the contaminated water is exposed sufficiently to air in the aeration sections A1, A2 and A3, and is further subjected to a biological oxidation treatment in the oxidation sections B1, B2, B3 and B4 to become treated water which is low in the B.O.D. and has oxygen dissolved therein. When this stage is reached, the contaminated water inflow adjusting valve is opened, whereby the contaminated water which flows in flows over the top of the centrally positioned aeration section A1 into the adjoining oxidation sections B1 and B2, with part of the water passing through the bottoms of the oxidation sections B1 and B2 to flow back again into said aeration section A1. Thus, the contaminated water, with a part thereof making a circulation through the sections as described above, then flows into the aeration sections A2 and A3 along with another part of circulating water that has passed through the bottoms of the oxidation sections B1 and B2, with a part thereof overflowing the aeration sections A2 and A3 back into the oxidation sections B1 and B2 to make a circulation through both sections, and then the water, while making the circulation, flows into the next oxidation sections B3 and B4 along with another part of circulating water which has overflown the aeration sections A2 and A3, and here again, a part of said water makes a circulation through the oxidation sections B3 and B4 and aeration sections A2 and A3. The water thus purified sufficiently during circulations flows out through the bottoms of the final oxidation sections B3 and B4 into the passages 16 along with another part of treated water flowing towards the overflow section and is finally released into the trough or flume 7.

According to the present device, as described above, the contaminated water is air-lifted in an oxygen-dissolved condition in each aeration section and then repeatedly circulated through the aeration sections and the oxidation sections where a germ-deposited filler is contained, and in the course of such repetitive circulation, the water is satisfactorily purified.

In the embodiment shown in FIGS. 9 and 10, an arrangement is made such that the circulation flow will proceed to both right and left sides (in the figures) in the tank 1 simultaneously, but in another embodiment shown in FIGS. 11 and 12, such flow of circulating water proceeds only in one direction, as the discharge end of the feed pipe 5 is positioned in the bottom opening of the aeration section A2 and only one passage 16 is provided for transferring the treated water. There is, however, not much difference between the two embodiments in their operating functions. In this case, as in the embodiment of FIGS. 9 and 10, it is preferable to introduce the contaminated water first into an aeration section which is located as far from the overflow section 6 as possible.

Although in the embodiment of FIGS. 9 and 10 the tank 1 as well as the aeration and oxidation sections are formed square, they may be shown as in other suitable configurations such as cylindrical, the latter being rather preferable as it requires less space for installation for the same performance.

As seen from, the foregoing description, according the present invention, at least three aeration sections and at least four oxidation sections are arranged alternately in a tank such that the contaminated water to be treated first has sufficient oxygen dissolved therein and is then forced to; circulate convectively so as to repeatedly pass the biological to areas to thereby have its purity increased. It is therefore possible with the present invention to achieve simplification and reduced size of the apparatus as compared with the prior art apparatus capable of treating the same amount of contaminated water as well as a greatly enhanced treating performance. The invention also allows treatment, with ease, of contaminated water with a high B.O.D. and further, in certain embodiments there is no possibility that the circulating water will be partly diverted from the main current to become a short-circuited flow to overflow without undergoing the biological oxidation treatment.

What we claim is:

1. An apparatus for biologically improving the quality of contaminated water, comprising a plurality of at least three side by side oxidation compartments spaced at intervals from each other, each being open at the top and bottom, said compartments having end walls defining between the adjacent compartments vertically extending aeration compartments, a biological oxidation section disposed within and filling the cross section of each oxidation compartment with the end walls of the compartment extending upwardly beyond the oxidation section so as to act as an overlflow for water coming up through the aeration compartments, aeration means at the lower end of each aeration compartment for feeding a flow of air into the bottom of the aeration compartments for establishing a circulating flow of contaminated water for lifting contaminated water up through said aeration compartments and over the upper ends of the compartment walls, a bottom beneath said compartments and having partitions extending upwardly to the bottoms of the biological oxidation sections in each oxidation compartment which lies between two aeration compartments to define sludge collection compartments beneath each aeration compartment and a portion of the oxidation compartment lying on each side of the respective aeration compartments, an overflow passage extending upwardly from the sludge collection compartment lying beneath the aeration compartment adjacent one end of the plurality of compartments to a level just slightly above the top of the biological oxidation sections with an overflow at the top thereof, and a contaminated water supply pipe opening into the lower end of the aeration compartment which is adjacent the other end of the plurality of oxidation compartments to supply contaminated water thereinto.

2. An apparatus as claimed in claim 1 further comprising a further plurality of side by side oxidation compartments spaced at intervals from each other and extending in the opposite direction from said first mentioned plurality of oxidation compartments and having the same construction as said firstmentioned oxidation compartments and having aeration compartments therebetween, further biological oxidation sections in the further oxidation compartments, further aeration means for each of the further aeration compartments, said bottom extending beneath said further compartments and having partitions extending upwardly to the bottoms of the further biological oxidation sections to define further sludge collection compartments and a further overflow passage extending upwardly from the sludge collection compartment lying beneath the aeration compartment at the opposite end of the plurality of compartments to a level just slightly above the top of the biological oxidation sections with an overflow at the top thereof, whereby the contaminated water is caused to flow in opposite directions from the aeration compartment into which the contaminated water supply pipe opens through the oxidation sections to the overflow passages.

3. An apparatus as claimed in claim 1 further comprising sludge returning conduits for each sludge collection compartment and extending from the bottom of the respective sludge collection compartment to the top of the respective aeration compartment, and pump means in said conduits for pumping sludge from the sludge collection compartments through the sludge returning conduits.

* * * * *